(12) United States Patent
Dunton

(10) Patent No.: US 6,526,366 B1
(45) Date of Patent: Feb. 25, 2003

(54) IMAGING SENSOR DEFECT MAP STORAGE

(75) Inventor: Randy R. Dunton, Phoenix, AZ (US)

(73) Assignee: Intel Corporation, Santa Clara, CA (US)

(*) Notice: Subject to any disclaimer, the term of this patent is extended or adjusted under 35 U.S.C. 154(b) by 0 days.

(21) Appl. No.: 09/574,690

(22) Filed: May 18, 2000

(51) Int. Cl.[7] ............................................. G01C 25/00
(52) U.S. Cl. ......................................... 702/116; 702/59
(58) Field of Search .......................... 250/208.1, 252.1; 257/447; 324/751; 348/246; 356/5.01, 73, 237.3; 359/811; 364/553, 579; 382/145, 149, 309; 430/30; 702/104, 116, 59

(56) References Cited

U.S. PATENT DOCUMENTS

| | | | | |
|---|---|---|---|---|
| 5,033,015 A | * | 7/1991 | Zwirn | 364/579 |
| 5,436,659 A | * | 7/1995 | Vincent | 348/246 |
| 5,726,915 A | * | 3/1998 | Prager et al. | 364/553 |
| 5,969,885 A | * | 10/1999 | Harder et al. | 359/811 |
| 6,011,619 A | * | 1/2000 | Steffan et al. | 356/237.3 |
| 6,091,249 A | * | 7/2000 | Talbot et al. | 324/751 |
| 6,141,045 A | * | 10/2000 | Tewinkle et al. | 348/246 |
| 6,169,319 B1 | * | 1/2001 | Malinovich et al. | 257/447 |
| 6,293,465 B1 | * | 9/2001 | Heller et al. | 235/454 |
| 6,323,942 B1 | * | 11/2001 | Bamji | 356/5.01 |

OTHER PUBLICATIONS

Yap–Peng Tan, Tinku Acharya; "A Robust Approach For The Detection Of Defective Pixels In An Image Sensor"; IEEE International Conference on Acoustics, Speech, and Signal Processing; vol. 4, 1999; pp2239–2242.*

Riordan W C, Miller R, Sherman J M, Hicks J; "Microprocessor Reliability Performance As A Function Of Die Location For A 0.25u, Five Layer Metal CMOS Logic Process"; IEEE 37 th Annual International Reliability Physics Symposium Proceedings; 1999; pp1–11.*

* cited by examiner

Primary Examiner—John S. Hilten
Assistant Examiner—Douglas N Washburn
(74) Attorney, Agent, or Firm—Marger Johnson & McCollom, P.C.

(57) ABSTRACT

An imaging sensor includes a defect marker allowing an imaging device in which the imaging sensor is installed to determine which pixels in the CMOS sensor are defective. During manufacturing, the pixels in the imaging sensor are tested. Defect markers are used for defective pixels, preferably using a non-volatile marking technique. After the imaging sensor is installed in the imaging device, the imaging device reads the defect markers from the imaging sensor to determine the defective pixels. The defect markers are read by exposing the pixels in the imaging sensor to photons. Eventually, all pixels in the imaging sensor should show some exposure. Pixels that still read as unexposed are then defective pixels. The imaging device can then compensate for defective pixels: e.g., by interpolating the defective pixels from their neighbors.

25 Claims, 5 Drawing Sheets

IMAGING SENSOR DEFECT MAP STORAGE

FIELD

This invention pertains to an imaging sensor, and more particularly to an imaging sensor having defects.

BACKGROUND

Complementary Metal Oxide Semiconductor (CMOS) sensors are an alternative to Charge Coupled Devices (CCDs) in imaging devices. Unlike a CCD, the individual picture elements (pixels) in the CMOS sensor are separately addressable. This gives CMOS sensors an advantage over CCDs: a defective pixel does not make the entire CMOS sensor unusable. Today, CMOS sensors are used in all manners of imaging devices: for example, digital still and video cameras, optical scanners, facsimile machines, and robotics, to name just a few.

But detecting defects is an expensive process, employing special equipment and test patterns to identify defective pixels in the CMOS sensor. This testing is done after production of the CMOS sensor to determine if the defects make the CMOS sensor unusable. An imaging device utilizing a CMOS sensor may compensate for a few defective pixels by interpolating from neighboring pixels. But too many defects clustered together may result in the CMOS sensor to be discarded.

Once the CMOS sensor passes testing, the results of the testing are discarded. Imaging device manufacturers then retest the CMOS sensor to determine which pixels are defective and "compensated." Because CMOS sensor testing is expensive and complicated, few facilities have the capability to do the testing. Further, if the imaging device is damaged, it is generally cheaper to replace the imaging device than to re-test the CMOS sensor after the imaging device has been repaired.

The present invention addresses at least in part these and other problems associated with the prior art.

DETAILED DESCRIPTION OF THE PREFERRED EMBODIMENT

Figure 1:
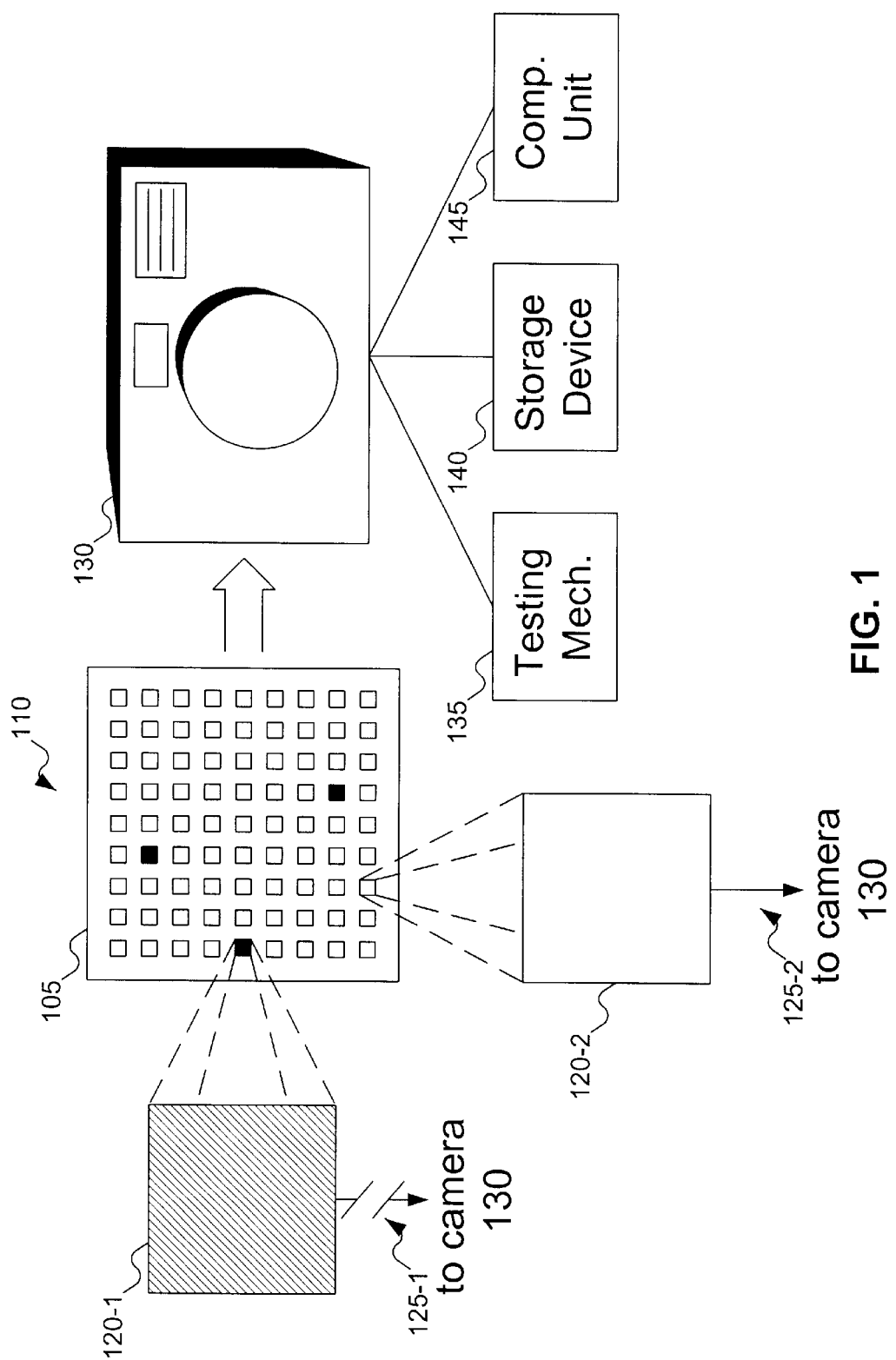
FIG. 1 is a schematic diagram that shows an embodiment of a digital camera including an embodiment of a Complementary Metal Oxide Semiconductor (CMOS) sensor in accordance with the invention.

FIG. 1 is a schematic diagram that shows a Complementary Metal Oxide Semiconductor (CMOS) sensor embodiment 105 with picture elements (pixels) 110 in accordance with the invention. Although the embodiment described herein utilizes a CMOS sensor, a person skilled in the art will recognize that the invention is applicable to other types of imaging sensors. Pixels 110 generally comprise photo diodes that change their electrical characteristics in response to illumination, referred to here as photodiodes and are arranged in an array on a die. Although FIG. 1 shows the pixels arranged in a rectangular array on the die, a person skilled in the art will recognize that other arrangements are possible: for example, a hexagonal arrangement. Some pixels may be defective; other pixels may operate properly. In this context, a pixel is considered defective if its behavior significantly deviates from an expected response. For example, pixel 120-1 shows a pixel that is defective. Pixel 120-1 may have one of a number of defects as described herein; more detail can be found hereafter with reference to FIG. 2. In comparison, pixel 120-2 is illustrated as an operational pixel. Provided the number of defective pixels in CMOS sensor embodiment 105 is relatively low enough and generally not too close together, CMOS sensor embodiment 105 will pass testing. Testing is known in the art and will not be described here. For example, although the invention is not limited in scope in this respect, a sensor may be limited to a specific number of defective pixels with a predetermined radius.

In an embodiment, defective pixels, like pixel 120-1 for example, are modified to return a known value when interrogated. The specifics of how defective pixels may be marked, called defect markers hereafter, may vary: for example, buried gate technology, such as is used in flash memory, or a metal fuse link may be used. A person skilled in the art will also recognize other ways defective pixels may be marked. It is desirable that the marking operate without applying power to the CMOS sensor, for convenience and usability. For example, in FIG. 1, interrogation line 125-1, used to interrogate pixel 120-1 as to its value, has been severed by burning out a fuse in interrogation line 125-1. Thus, in this example of CMOS sensor embodiment 105, upon interrogation, defective pixel 120-1 will return a value as if it were unexposed to photons. In contrast, because interrogation line 125-2 is unbroken, operational pixel 125-1 may be read to provide a value related to the number of photons impinging upon it.

In FIG. 1, CMOS sensor embodiment 105 is installed in digital camera embodiment 130. A person skilled in the art will recognize that CMOS sensor embodiment 105 may be installed in other imaging devices, for example, digital video cameras, optical scanners, facsimile machines, and robotic devices (e.g., robots that rely on visual input to perform their tasks). Digital camera embodiment 130 includes testing mechanism 135 and storage device 140. Testing mechanism 135, in this camera embodiment, reads the defect markers from CMOS sensor embodiment 105 and identifies the defective pixels of CMOS sensor embodiment 105 in a defect map stored in storage device 140. Testing mechanism 135 may read the defect markers in CMOS sensor embodiment 105 while calibrating digital camera embodiment 130, although the invention is not limited to reading the defect markers during instrument calibration. In this embodiment, storage device 140 comprises a programmable read-only memory (PROM), but a person skilled in the art will recognize that other storage devices can be used, such as non-volatile memory, for example. Further, volatile memory may also be used, although this may be more complex: i.e., accommodating due to the risk of loss of the stored information. Digital camera embodiment 130 may also include compensation unit 145, which in this embodiment compensates for the defective pixels stored in the defect map in storage device 140. For example, compensation unit 145 may identify pixels to be used in place of defective pixels.

Figure 2:
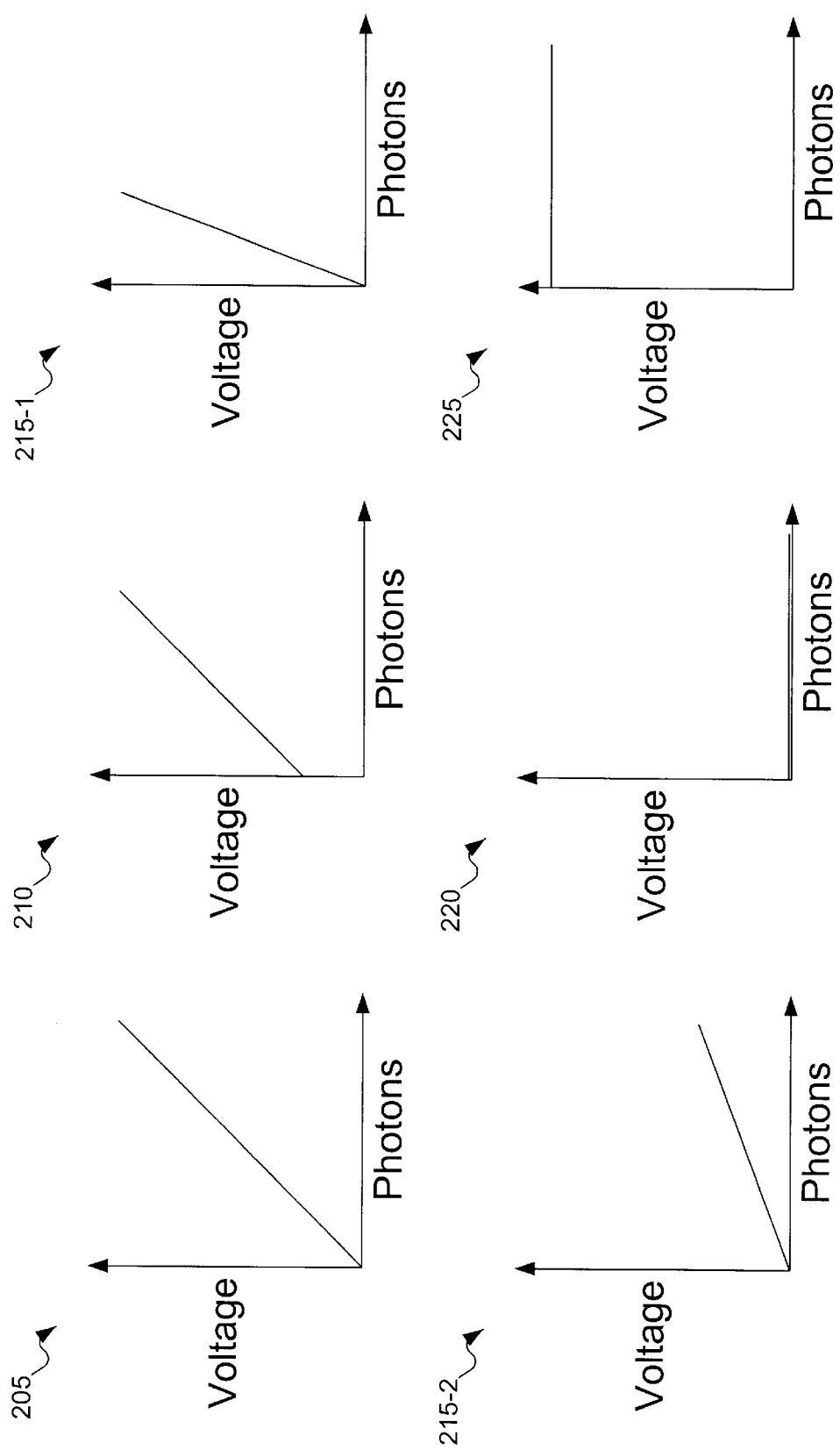
FIG. 2 shows typical defects that may occur in a CMOS sensor, such as the one of FIG. 1.

FIG. 2 uses plots to illustrate typical defects that can occur in CMOS sensor embodiment 105, although these defects are just examples. For example, graph 205 shows the performance graph of an operational pixel in CMOS sensor embodiment 105. After normalization, the voltage stored by a pixel in CMOS sensor 105 will typically increase in a linear relationship with the number of photons to which the pixel has been exposed. Here, assume that the units are such that the slope of the line in graph 205 is one. Graph 210, in contrast, shows the performance graph of a pixel, here, with an offset. In an offset defect, the pixel returns a voltage, although no photons are impinging. Graphs 215-1 and 215-2 show performance graphs of defective pixels with gain defects. In a gain defect, the voltage accumulates too quickly or too slowly relative to the number of photons to which the pixel has been exposed. Graph 220 shows the performance graph of a defective pixel with a "black" defect. In a "black" defect, the pixel provides a voltage as if it has not been exposed to photons, even when the pixel has been. Graph 225 shows the performance graph of a pixel with a "white" defect. In a "white" defect, the pixel provides a voltage as if it has been exposed to photons, even when the pixel has not. A person skilled in the art will also recognize other defects applicable to pixels.

Pixels suffering from these and other defects beyond a certain tolerance are not generally usable in capturing the image. The pixel will generally reflect a color or intensity that differs from a desired color or intensity. Pixels suffering from these defects, as examples, are considered defective. The testing procedures referred to above with reference to FIG. 1 therefore are typically employed to identify pixels suffering from these defects.

Figure 3:
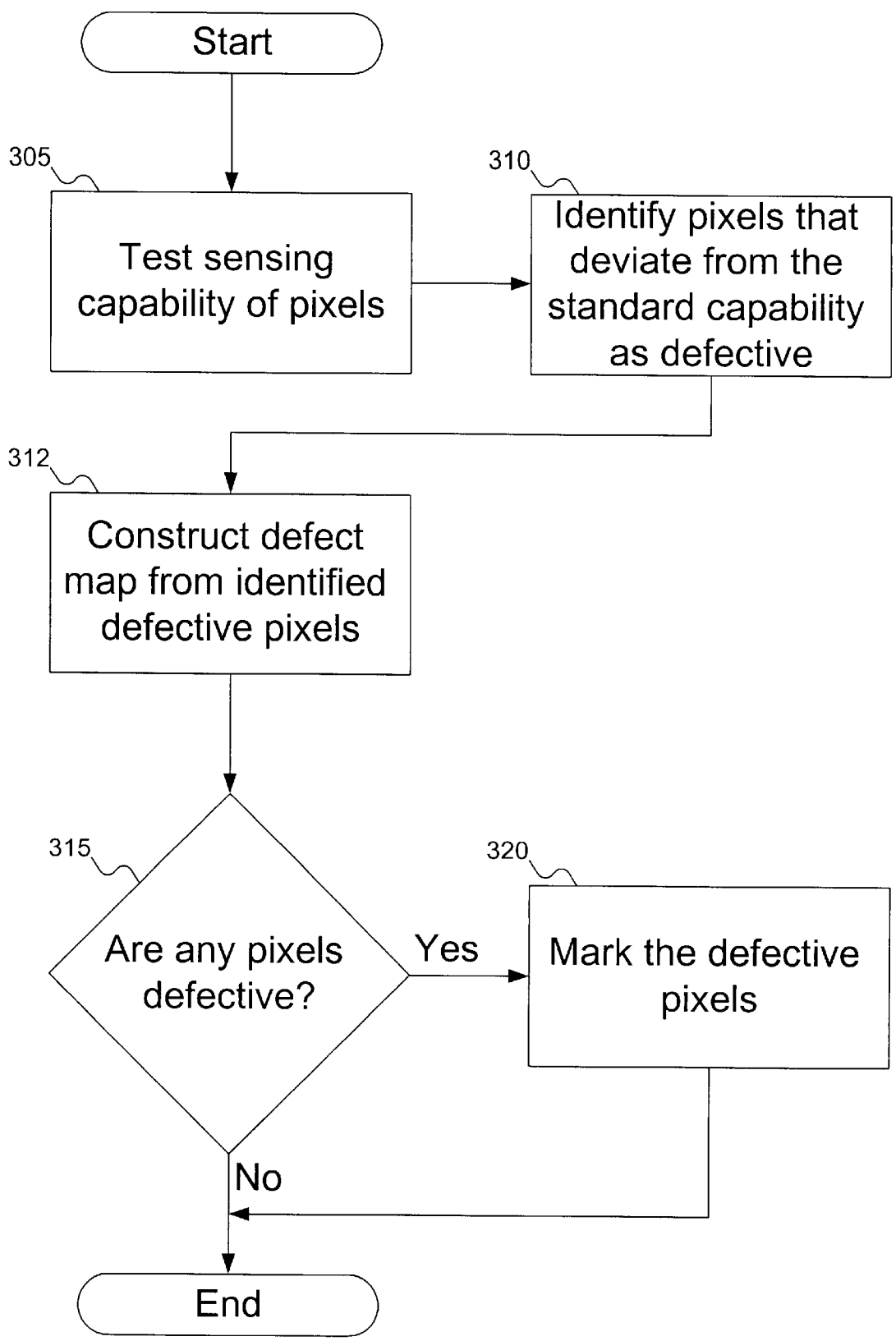
FIG. 3 is a flowchart showing an embodiment of a method testing CMOS sensors in accordance with an embodiment of the invention.

FIG. 3 is a flowchart showing an embodiment of a method of testing CMOS sensors in accordance with the invention. In FIG. 3, the pixels in the CMOS sensor are tested at block 305. At block 310, pixels with defects, such as, as one example, pixels whose performances deviate from a standard or expected capability by more than a threshold amount) are identified. At block 312, defect markers are constructed from the identified defective pixels. If pixels are identified, then at block 320 the defective pixels are marked. This stores the defect markers in the CMOS sensor. As discussed above, in this embodiment the defective pixels are marked to provide a value as if unexposed, even if photons are impinging on the device.

Figure 4:
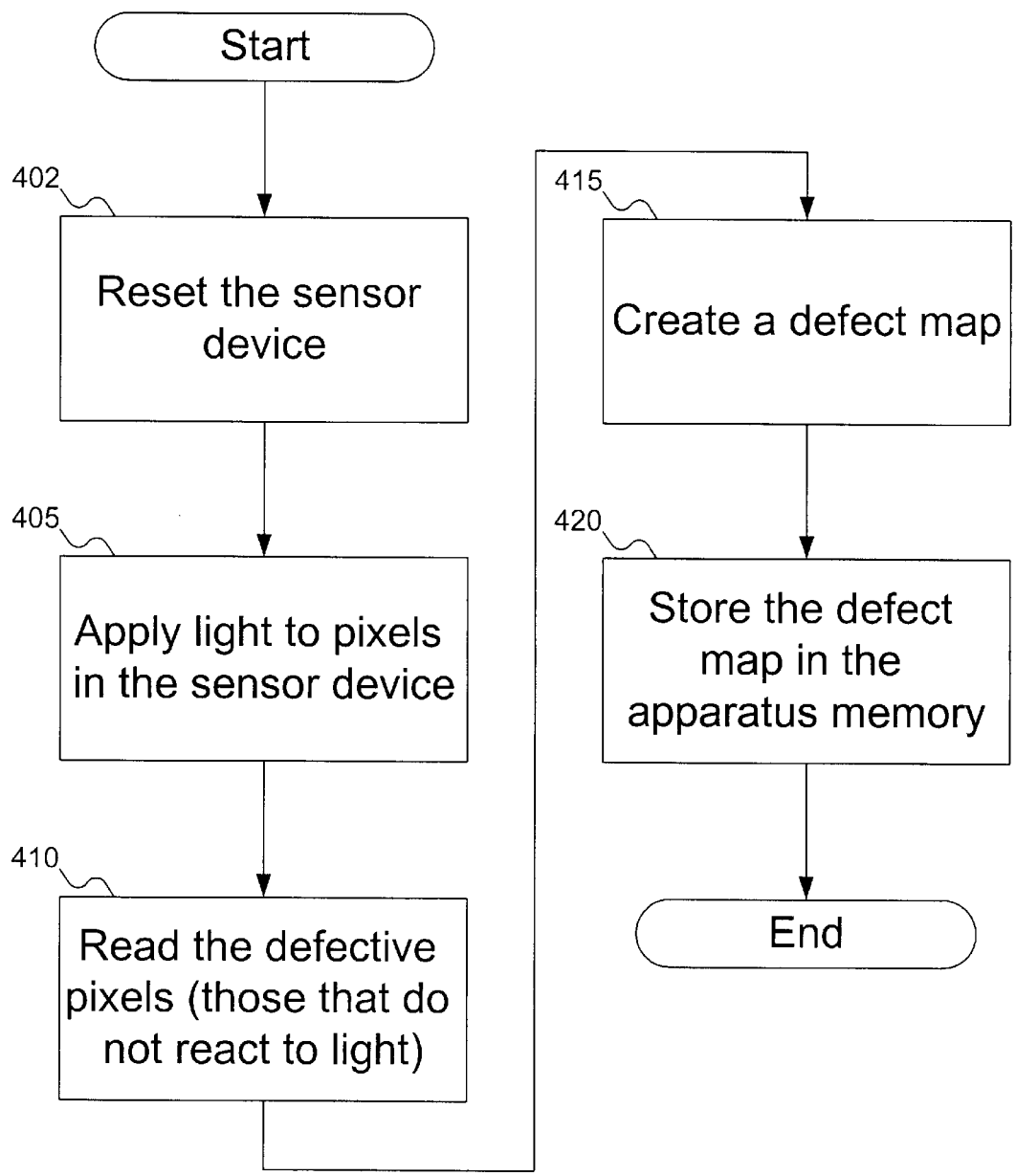
FIG. 4 is a flowchart showing an embodiment of a method of testing digital cameras using CMOS sensors according to an embodiment in accordance with the invention.

FIG. 4 is a flowchart of an embodiment of a method of testing a CMOS sensor according to the one embodiment. At block 402, the CMOS sensor is reset. At block 405, the pixels of the CMOS sensor are exposed to light. At block 410, the pixels, including the defective pixels, are interrogated for their values. By interrogating the defective pixels for their values, the imaging device can build a defect map of the CMOS sensor. In this embodiment, the defective pixels read as unexposed, even when exposed to light. Thus, after a sufficient exposure period, pixels still reading "black" are pixels marked as defective. At block 415, the imaging device creates a defect map. Finally, at block 420, the imaging device stores in its memory the defect map.

Figure 5:
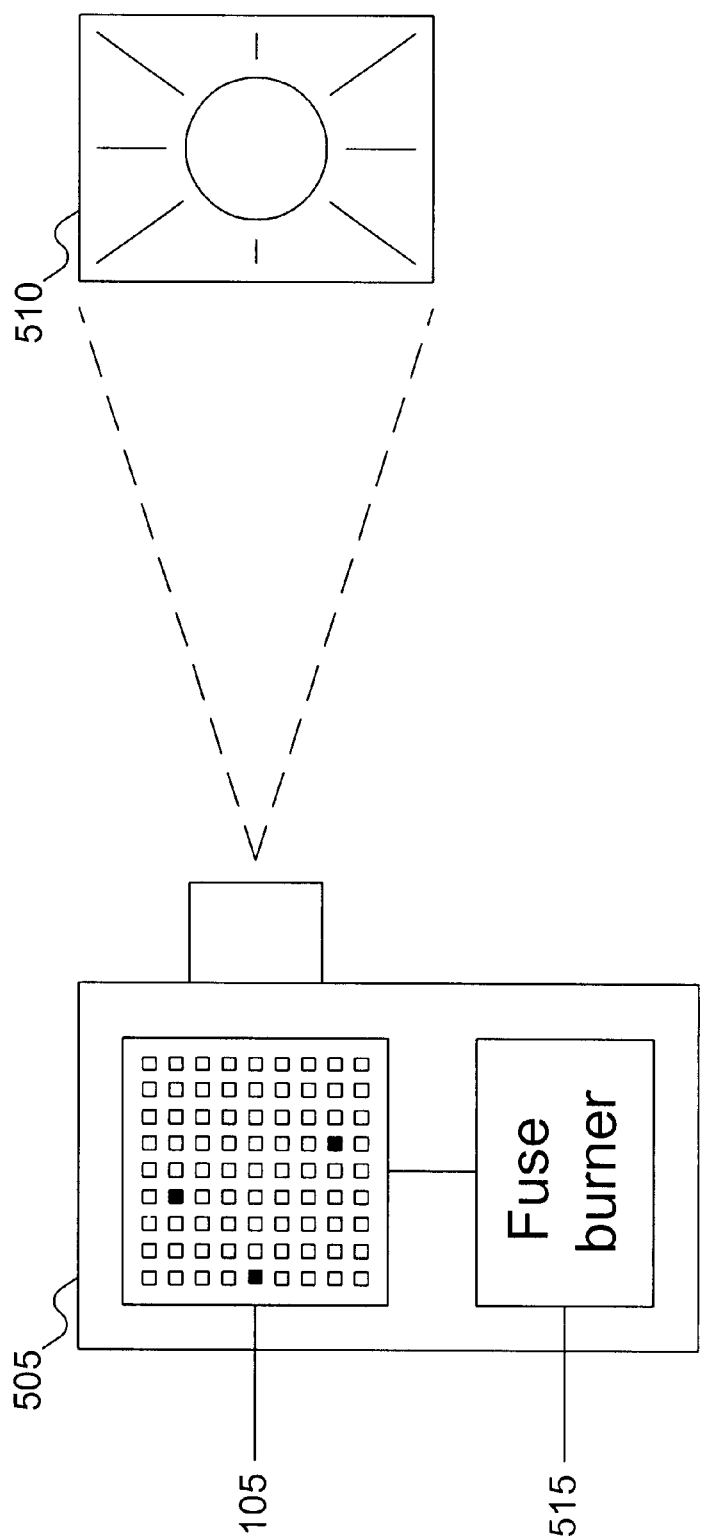
FIG. 5 is a schematic diagram that shows an embodiment of testing equipment testing the CMOS sensor embodiment of FIG. 1.

FIG. 5 shows an embodiment of testing equipment employed to mark pixels in the CMOS sensor embodiment of FIG. 1 as defective. In FIG. 5, CMOS sensor embodiment 105 is mounted on testing equipment 505. Testing equipment 505 uses test patterns, such as test pattern 510, to determine which pixels have defects, as discussed above with reference to FIGS. 1 and 2 as examples. Testing equipment embodiment 505 exposes CMOS sensor embodiment 105 to test pattern 510 for a sufficient period to properly test each pixel in CMOS sensor embodiment 105. Testing equipment embodiment 505 also includes marking equipment to set a pixel, such as are defective. For example, testing equipment 505 includes fuse burner 515, which can burn out a fuse, severing the interrogation line of a defective pixel. A person skilled in the art will also recognize other embodiments of testing equipment may be employed.

The previously described embodiment includes several advantages. Testing the CMOS sensor after installation in the digital camera or other imaging device will omit formal testing. The user simply has to expose the CMOS sensor to light to allow the imaging device to determine which pixels in the CMOS sensor are defective. Alternatively, because CMOS sensors respond to dark noise, with sufficient exposure to heat, the operational pixels in the CMOS sensor will eventually read as "white," even with a dark image.

Furthermore, repairing broken imaging devices is feasible for the previously described embodiment. In the past, because of the costs of testing, broken imaging devices have been discarded rather than repaired. The previously described embodiment enables identifying defective pixels, making repair potentially feasible.

Having illustrated and described the principles of my invention, it should be readily apparent to those skilled in the art that the invention can be modified in arrangement and detail without departing from such principles. I claim all modifications coming within the spirit and scope of the accompanying claims.

I claim:

1. An imaging sensor comprising:
    a die;
    a plurality of pixels arranged in an array on the die; and
    a defect marker for each of one or more defective pixels, the defect markers being stored in the pixel array of the imaging sensor.

2. An imaging sensor according to claim 1, wherein the defect markers are adapted to provide a predetermined voltage during operation.

3. An imaging sensor according to claim 1, wherein the imaging sensor is a CMOS sensor.

4. An imaging sensor according to claim 1, wherein the sensor further comprises circuitry for accessing the values of the plurality of pixels.

5. An imaging sensor according to claim 1, wherein the sensor is incorporated in a digital imaging device, said digital imaging device comprising a digital still camera, a digital video camera, an optical scanner, a facsimile machine, or a robotic device.

6. An imaging sensor according to claim 5, wherein the digital imaging device includes a testing mechanism to access the defect markers of the imaging sensor.

7. An imaging sensor according to claim 5, wherein the digital imaging device includes a compensation unit to compensate for the defective pixels.

8. An apparatus to store a defect map in an imaging sensor, the apparatus comprising:
    testing equipment to locate a defective pixel; and
    a pixel marker to set the located defective pixel in a pixel array of the imaging sensor.

9. An apparatus according to claim 8, wherein the pixel marker includes an apparatus to burn a fuse to set the located defective pixel.

10. A method for storing defect markers for each of one or more defective pixels in an imaging sensor, the method comprising:
    determining whether one or more pixels are defective;

building defect markers; and storing the defect markers in a pixel array of the imaging sensor.

11. A method according to claim 10, wherein determining whether one or more pixels are defective includes:

testing a sensing capability of the pixels;

comparing the sensing capability with a standard sensing capability; and marking the pixels exhibiting as defective.

12. A method according to claim 10, wherein storing the defect markers includes setting the defective pixels in the imaging sensor.

13. A method according to claim 12, wherein setting the defective pixels includes setting the defective pixels to operate free of power.

14. A method according to claim 12, wherein setting the defective pixels includes setting the defective pixels to "black."

15. A method for calibrating a digital imaging device including an imaging sensor, the method comprising:

activating the imaging sensor, including exposing pixels in the imaging sensor to light, including exposing pixels in the imaging sensor to light using a random pattern;

reading a defect marker from the imaging sensor; and compensating for the defective pixel in the digital imaging device.

16. A method according to claim 15, wherein reading the defect marker includes sensing a pixel that does not react to exposure to light.

17. A method according to claim 15, wherein compensating for the defective pixel includes storing the compensation for the defective pixel in a memory within the digital imaging device.

18. An article comprising:

a storage medium, said storage medium having stored thereon instructions, that, when executed by a computing device, result in:

determining whether one or more pixels are defective;

building defect markers; and storing the defect markers in a pixel array of the imaging sensor.

19. A computer-readable medium containing a program according to claim 18, wherein determining whether one or more pixels are defective includes:

testing a sensing capability of the pixels;

comparing the sensing capability with a standard sensing capability; and marking the pixels as defective.

20. A computer-readable medium containing a program according to claim 18, wherein storing the defect markers includes setting the defective pixels in the imaging sensor.

21. A computer-readable medium containing a program according to claim 20, wherein setting the defective pixels includes setting the defective pixels to operate free of power.

22. A computer-readable medium containing a program according to claim 20, wherein setting the defective pixels includes setting the defective pixels to "black."

23. An article comprising:

a storage medium, said storage medium having stored thereon instructions, that, when executed by a computing device, result in:

activating the imaging sensor, including exposing pixels in the imaging sensor to light, including exposing pixels in the imaging sensor to light using a random pattern;

reading a defect marker from the imaging sensor; and compensating for the defective pixel in the digital imaging device.

24. A computer-readable medium containing a program according to claim 23, wherein reading the defect marker includes sensing a pixel that does not react to exposure to light.

25. A computer-readable medium containing a program according to claim 23, wherein compensating for the defective pixel includes storing the compensation for the defective pixel in a memory within the digital imaging device.

* * * * *

UNITED STATES PATENT AND TRADEMARK OFFICE
CERTIFICATE OF CORRECTION

PATENT NO. : 6,526,366 B1
DATED : February 25, 2003
INVENTOR(S) : Randy R. Dunton It is certified that error appears in the above-identified patent and that said Letters Patent is hereby corrected as shown below:

<u>Column 4,</u>
Line 62, "to bum a fuse" should read -- to burn a fuse --

Signed and Sealed this

Twenty-fourth Day of June, 2003

JAMES E. ROGAN
*Director of the United States Patent and Trademark Office*